United States Patent [19]
Johnston et al.

[11] Patent Number: 5,735,635
[45] Date of Patent: Apr. 7, 1998

[54] GRAVITY FEED WATERING SYSTEM FOR PLANTS

[75] Inventors: David B. Johnston, Fairport, N.Y.; Vincent P. Johnston; Marjorie R. Johnston, both of Sheridan, Wyo.

[73] Assignee: Northern Tier Gardens Corporation, Fairport, N.Y.

[21] Appl. No.: 583,188

[22] Filed: Jan. 4, 1996

[51] Int. Cl.⁶ .................................................. A01G 25/00
[52] U.S. Cl. .......................... 405/36; 405/51; 239/542
[58] Field of Search ................................ 405/36, 37, 39, 405/40, 43, 48, 51; 239/542, 11, 547

[56] References Cited

U.S. PATENT DOCUMENTS

| | | | |
|---|---|---|---|
| 14,081 | 3/1856 | Linxweiler | 405/40 |
| 1,042,501 | 10/1912 | Thompson | 405/39 |
| 3,762,937 | 10/1973 | King, Sr. | 405/40 X |
| 3,863,895 | 2/1975 | Bumpstead | 239/542 |
| 3,874,597 | 4/1975 | Stephens et al. | 239/542 |
| 4,141,477 | 2/1979 | Hengesbach | 239/542 X |
| 4,166,580 | 9/1979 | Meckel | 239/542 |
| 4,194,695 | 3/1980 | Schopp | 239/542 |
| 4,930,934 | 6/1990 | Adkins | 405/37 |
| 5,024,555 | 6/1991 | York | 405/48 |
| 5,102,259 | 4/1992 | York et al. | 405/48 |

*Primary Examiner*—Tamara L. Graysay
*Assistant Examiner*—Frederick L. Lagman
*Attorney, Agent, or Firm*—Jaeckle Fleischmann & Mugel, LLP

[57] ABSTRACT

A low cost, modular plant irrigation system using any convenient container as a reservoir to hold water, including a detachable manifold connected to the reservoir, one or more detachable dripper devices to produce by gravity droplets of water to flow through detachable tubing of selectable sizes and lengths from the manifold to a variable number and types of plant sites, and additional control devices at either or both the dripper devices and the plant sites to individually control selectively and variably the amount of water flowing to each plant site.

19 Claims, 6 Drawing Sheets

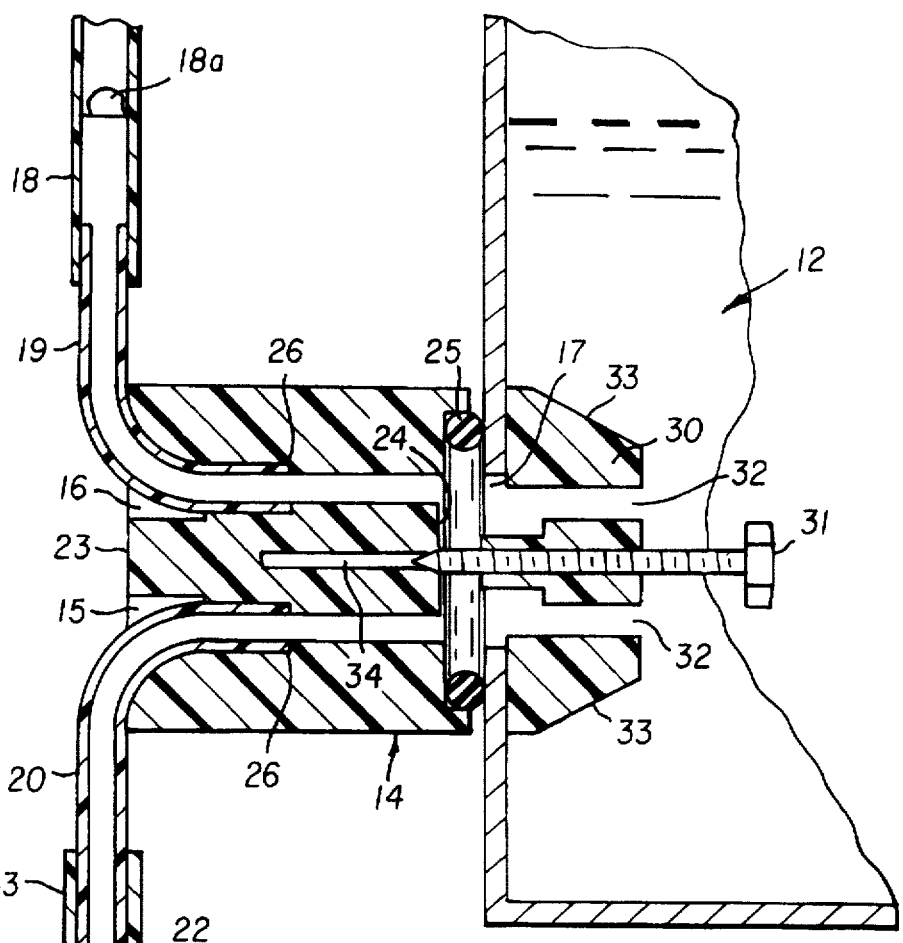
FIG. 3
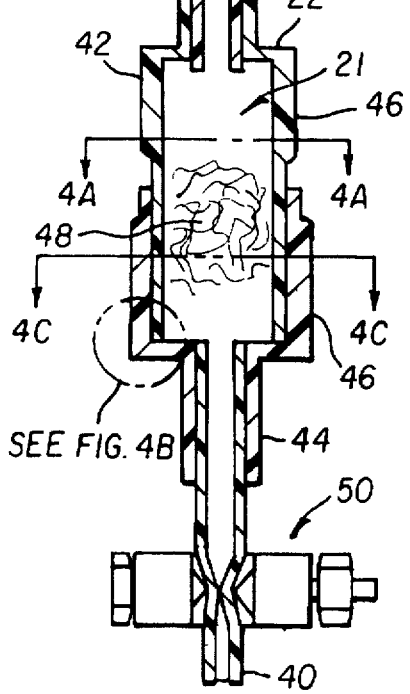
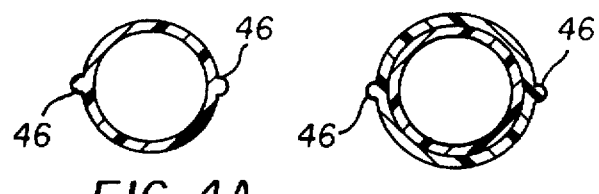
FIG. 4A   FIG. 4C
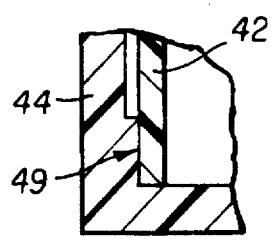
FIG. 4B

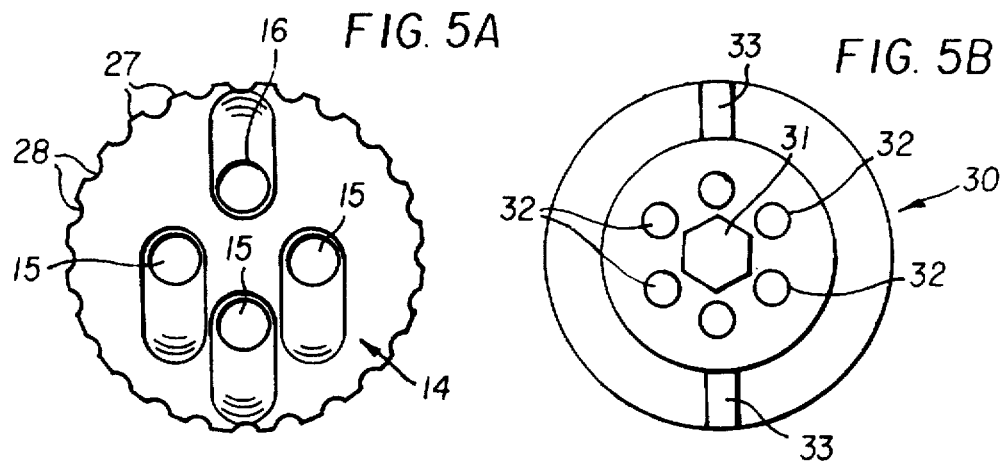
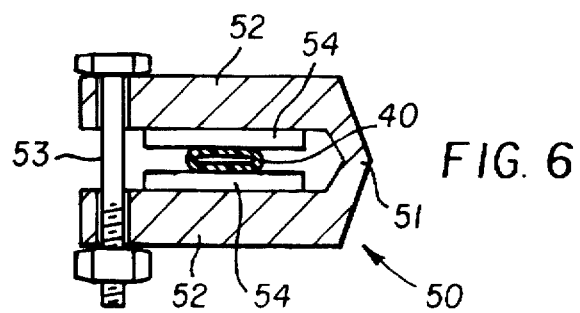
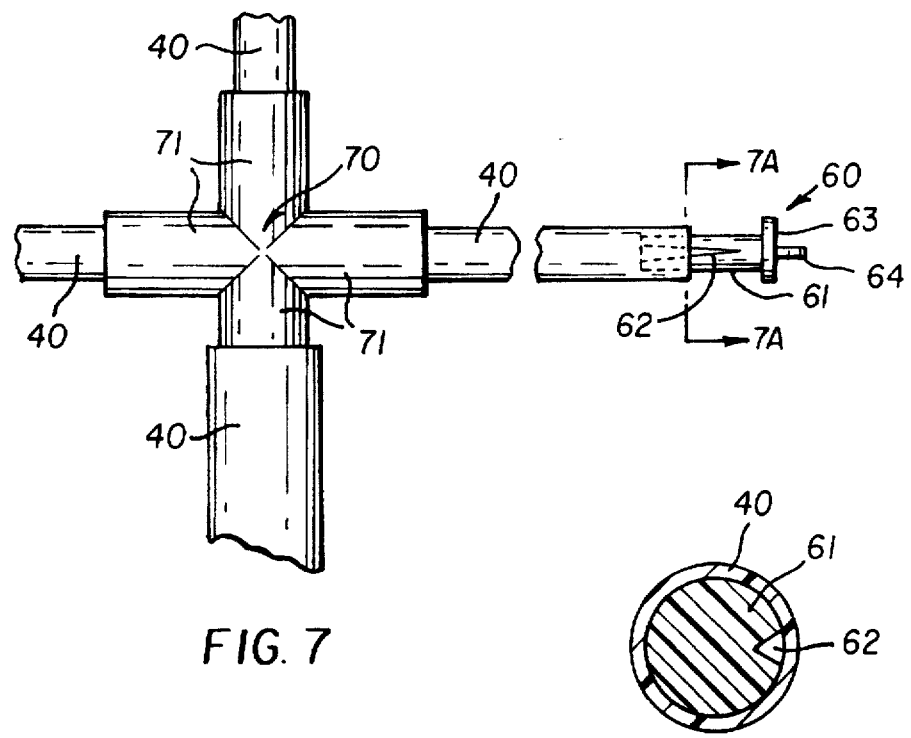

GRAVITY FEED WATERING SYSTEM FOR PLANTS

BACKGROUND

The amount of water needed for growing plants can depend on many variables, such as temperature, humidity, wind, rainfall, soil type, plant size, plant type, sub-irrigated land, and root depth. In addition, much of the U.S. and the world is short of arable water. Even where there is an adequate supply of water for growing plants, it often is very expensive.

By filling and then using water from reservoirs such as buckets, barrels and tanks from wells, rivers, streams, rain water, irrigation pipes or ditches, and the like, as well as from public systems, gardeners can save time and money and raise environmentally friendly and useful flower gardens, vegetables, shrubs and trees. However, a continuous supply of water is generally preferred by most plants, whereas it is a necessity for some plants. For example, with properly applied and continuous feeding, potted and indoor plants can thrive on as little as ¾ gallon of water per week, whereas vegetables, flowers and small bushes may use from 3 to 7 gallons per week, and hundreds of gallons per week may be needed for large trees.

Artificial irrigation systems for farms and gardens are, of course, well known. Irrigation systems generally will transport water either at predetermined time intervals or continuously to plant sites and will either irrigate the land area generally by spraying or direct the water through canals to rows of plants. It also is generally known to provide plant feeding mechanisms that apply water directly to plant sites. For example, U.S. Pat. No. 1,453,401 to Mattson discloses a plant watering device having a number of water delivery tubes, each attachable to a specific potted plant, and internally containing a valve to adjust the water flow simultaneously to all of the plants. U.S. Pat. No. 4,291,836 to Chen-Hsiung also discloses apparatus for intermittently supplying pre-determined quantities of water to plants at regular pre-determined intervals from a transparent tank that accumulates and stores water, as well as a scale on the tank to indicate the amount of available water supply. U.S. Pat. Nos. 4,321,937 to Littlehale and 5,020,939 to Tsuruta each discloses means for automatically supplying water to plants by drip mechanisms in which the water is fed to the plants according to the available water supply.

SUMMARY OF THE INVENTION

Our invention is a very flexible yet inexpensive low pressure, low flow rate drip watering system for delivering water and plant treatments such as fertilizer directly and efficiently to the root systems of plants. It comprises a modular system including at least one manifold to remove water from a reservoir, at least one dripper device to produce droplets of water, and means to deliver the water droplets selectively and directly to various plant sites at controlled and adjustable rates. Practical for watering a wide range of plantings in both variety and number, as well as in variations of garden layouts, it is designed to deliver water continually and to eliminate the need for electrical or mechanical timers and/or intensively managed watering schedules. Even in areas such as the western and some southern regions of the United States, where water sources may be limited and/or subject to irregular flows that water must be stored, our invention will provide opportunities to raise flowers, vegetables, bushes or trees not otherwise thought possible.

Because our invention places the water right at the plant sites, gardeners should actually save water by watering as little as 5% of the total land area. In the spaces between the plants and the paths between rows of plants, weeds won't grow without the water, and the walkways remain dry and free of mud during plant inspections and harvest. More importantly, plants mature faster and can produce more if they have a steady day and night water supply. Gardeners will also find that our invention takes less time, less water and energy, and generally is more cost-efficient than other "automatic" watering systems, such as spraying, flood irrigation and expensive pressure systems. Actual savings in the cost of water of course are influenced by rainfall, soil, size and type of plants, but the savings with our invention can be as high as 80% to 90% over some other irrigation systems.

DETAILED DESCRIPTION

Our invention will be better understood by reference to the following detailed description and the accompanying drawings wherein:

FIG. 3 is a partial vertical cross-sectional view of certain of the important components of our invention as shown in FIG. 2;

FIGS. 4A, 4B and 4C are detailed sectional views of the dripper device taken on the corresponding lines in FIG. 3;

FIGS. 5A and 5B are front and rear views, respectively, of the manifold and connector of FIG. 3;

FIG. 6 is a detailed partial cross sectional view of a clamp to control the drip rate at the dripper device;

FIG. 7 is a detailed view of other components of our invention comprising the water distribution means;

FIG. 7A is a cross sectional view taken on line 7A–&A in FIG. 7;

Figure 1:
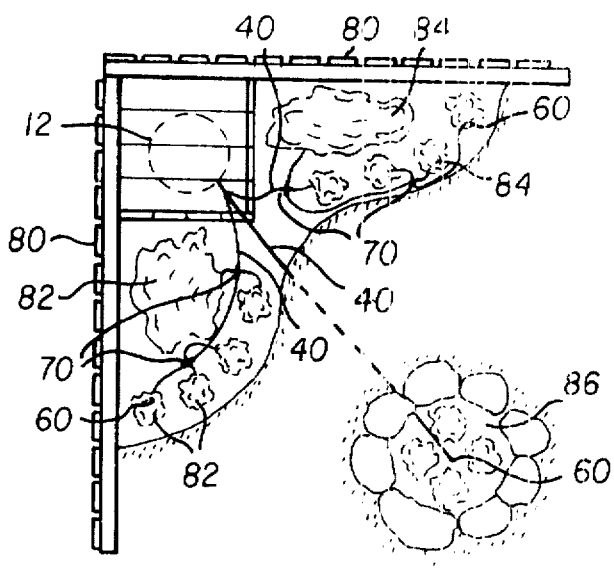
FIG. 1 is the top view schematically showing a typical irrigation site using a preferred embodiment of our invention.
Figure 2:
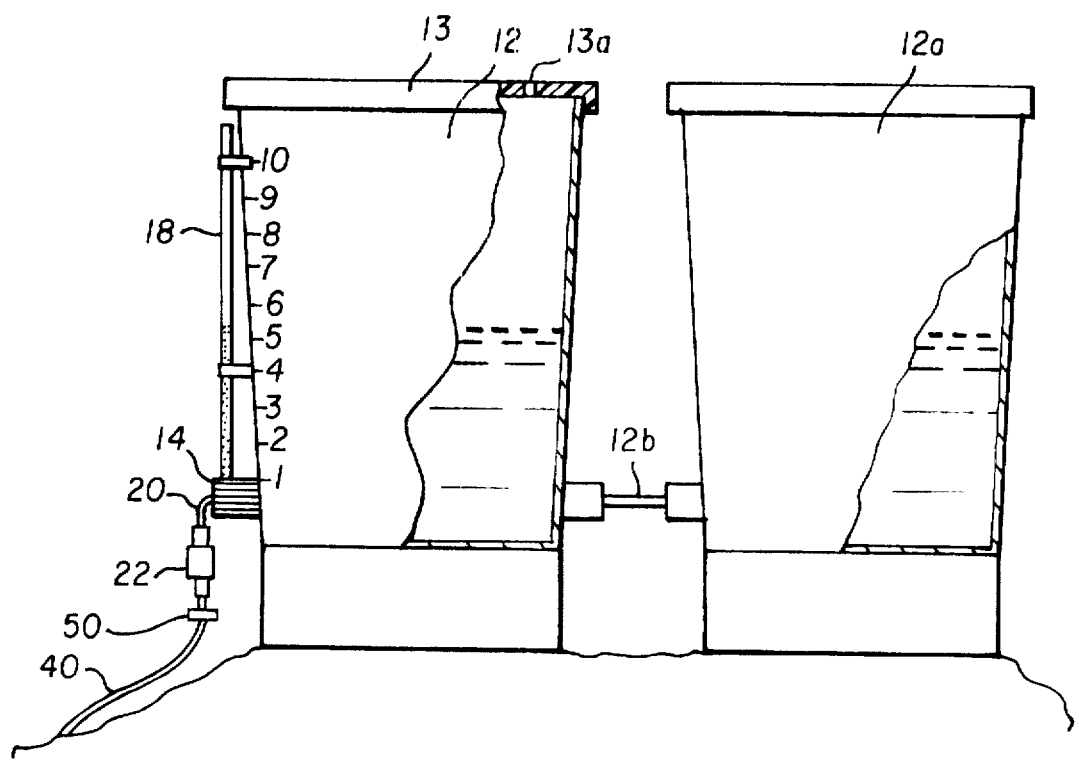
FIG. 2 is a side view illustrating many of the components of our invention.

Referring to FIGS. 1 and 2, water for the drip system of our invention preferably comes from a reservoir 12, which should be of a reasonable size (e.g., 25 gallons) and be elevated above the ground level of the plants to be watered. Reservoir 12 preferably has a lid 13 with a breather hole 13a as shown or formed by a screen to keep debris from collecting in the reservoir 12. Attached to reservoir 12 is a manifold 14, to be described in more detail, having as will be illustrated four water flow ports 15, 16 (see FIGS. 3 and 5A) communicating through a circular side wall opening 17 in the reservoir 12 for drawing water from reservoir 12. As shown in FIGS. 2 and 3, port 16 is connected without obstruction by a flexible plastic or rubber tube 19 to a vertical sight glass tube 18, in which water from the reservoir 12 will seek its level in sight glass 18 and thus provide a visual indication of the level of water in reservoir 12. A floating pith ball 18a as shown (preferably of a bright color for visibility from a distance) within the sight glass 18 can be read together with a volume measuring scale on either the reservoir wall or sight glass 18 for determining the volume of water in reservoir 12.

The other three ports 15 are dripper ports each of which is connected by a suitable flexible plastic or rubber tube 20 to a dripper cavity 21 formed by a dripper device 22, to be described in further detail. Each of the ports 15 and 16 is preferably circular in cross section and extends the entire horizontal length of manifold 14 from its outer or front surface 23 to a recessed back surface 24 that retains a water-sealing O-ring 25 as shown. O-ring 25 should be of a resilient rubberized material and of sufficient thickness to overcome the contour of the reservoir 12 when the manifold is attached.

At the front surface 23 as shown in FIG. 4, the ports 15, 16 are flared to enable easier insertion of tubes 19, 20, but the flared portions are extended at a suitable radius as shown upward in the case of port 16 and downward in the case of ports 15, to enable the tubes 19, 20 to form a gradual curve in the desired direction and thereby eliminate creases in the tubes. The ports 15, 16 themselves preferably are slightly tapered with the diameter nearest the back surface 24 slightly smaller than the outer diameters of tubes 19 and 20 such that the tubes are frictionally held in place by manifold 14. In addition, a reduced diameter collar 26 preferably is molded into each port 15, 16 to act as a positive stop and prevent each tube 19, 20 from being inserted beyond back surface 24, thereby unintentionally blocking or significantly reducing water flow through tubes 19, 20.

One or more optional, additional reservoirs 12a as shown in FIG. 2 can be connected in series with reservoir 12 by unrestricted fluid lines also using the manifold/connectors as generally illustrated at 12b to effectively increase the volume of available water without significantly changing the standing water pressure that would result from using a taller tank.

The outer peripheral surface 27 of manifold 14 can be of any convenient shape, but we prefer the cylindrical shape as shown with longitudinal grooves 28 around the periphery 27 to form a firm gripping surface when the manifold 14 is to be attached to or removed from reservoir 12.

Manifold 14 preferably is positioned a short distance above the bottom of reservoir 12 to prevent sediment in the reservoir from being drawn into manifold 14 and the downstream components. This positioning also enables some water to always remain in the reservoir as a weight to prevent tipping by wind or animals. Referring again to FIG. 3 and to FIG. 5B, a connector 30 detachably retains manifold 14 on reservoir 12 by a bolt or a self-tapping wide pitched threaded screw 31 (shown only partially inserted) on its central axis that engages a threaded hole 34 on the center axis of manifold 14 through the side wall opening 17 of reservoir 12. The diameter of connecter 30 at the face engaging the side wall surrounding opening 17 preferably should be the same as that of the back surface 24 of manifold 14, but is reduced to a narrower uniform diameter as shown in FIG. 5B and with a pair of opposing vertical flanges 33 by which to turn connector 30 by hand.

Between flanges 33 and extending the horizontal length of connector 30 at its wider diameter are a number of openings 32 (six are shown) to permit flow of water from within reservoir 12 to ports 15, 16. The openings 32 in connector 30 should have a total cross-sectional area that is larger than the total cross-sectional area of the ports 15, 16, but each opening 32 is smaller in cross-sectional area than the cross-sectional areas of each of the individual ports. This will ensure a significant open flow area will be present regardless of the final rotational positions of manifold 14 and connecter 30 when they are tightened in place.

Although the components of our invention can be made in a wide variety of sizes and dimensions for a wide variety of applications, for general gardening purposes, our preferred sizes are a manifold 14 of about a two inch outer diameter and a two inch length with each port 15, 16 about 0.5 inch diameter as described above. The connecter 30 also has about a two inch outer diameter at its connecting face side and about a one inch diameter at its back or inner side with each opening 32 having about a 0.2 inch diameter.

Each dripper device 22, somewhat analogous to the IV drip systems used in hospitals, is suspended vertically from manifold 14 by a tube 20, which preferably is short in length so that flow rates to all of the plants can be controlled and monitored at a convenient site adjacent to reservoir 12. The dripper devices 22 each are then connected to a flexible water supply tube or hose 40 to direct water to the various plant sites. Each dripper device 22 consists of a hollow upper section 42 that frictionally fits into a hollow lower section 44 and between them form the cavity 21 needed to ensure dripping as opposed to rivulets of water. Sections 42 and 44 each have, respectively, connecting legs 43, 45 for press fit attachment of the tube 20 and tube or hose 40. At least one but preferably both upper and lower sections 42 and 44 should be transparent in order to observe clearly and to time the drip rates. Opposing grips 46 can be molded into both sections 42 and 44 to make their attachment and separation easier. A replaceable, porous filter material 48 such as a wad of loose cotton is positioned in each cavity 21 to filter out dirt and the like from the water. When the filter 48 gets dirty, it can be discarded by separating the sections 42 and 44 and a new pinch of cotton added. Even a wad of cotton from a medicine bottle can last for months, but it should be changed as it gets dirty.

To accomplish the press fit of upper section 42 into the lower section 44, only the bottom portion 49 of the cavity of lower section 48 is slightly smaller in diameter than the outer diameter of the upper section 42 (shown exaggerated in FIG. 4B) in order to frictionally engage the upper section 42. By limiting the frictionally engaging surface to just the lower end 49, the sections 42 and 44 can more readily and accurately fit together. This also will allow easier access to the dripper cavity 21 for filter replacement. A drip cavity 21 of about 1.7 inches in height and about 0.8 inches in diameter is a very workable size for continuous drip rates at the preferred water volumes and to ensure that drops of water are formed as opposed to streams even if the drippers become slanted of up to about 45 degrees while in use. The tubing 20 inserted into the upper section 42 of the dripper at that end preferably should have a straight lateral cut and protrude slightly down into the cavity 21 of the dripper 22, as dripping may not occur if it does not protrude. The lower section 44 should be of the same material as the upper section 42 for a consistent press fit over variations in ambient temperature.

The drip, or the amount of water per given amount of time, may be controlled downstream or upstream of the dripper 22 by a clamp 50 (see FIG. 6) designed to variably pinch the tubing to alternately slow or increase the flow rate. As the tubing is pinched, it creates a flow restriction that is sufficient to slow the flow out of the reservoir 14 to the desired frequency. For the embodiment shown, clamp 50 should be capable of controlling the flow of liquid through dripper 22 to as low as 20 drips per minute or about 1 to 2 gallons of liquid per day, without totally closing the tubing. Clamp 50 as shown comprises a continuously molded main section consisting of legs 52 joined at one end by an integral resilient spring section 51. The other ends of the legs 52 form a pair of aligned holes into which a clamp bolt 53 is inserted to continuously vary the degree of closure of legs 52 and thereby control stricture of the tubing. Clamp bolt 53 should be made of a rigid material having a very low coefficient of thermal expansion in order not to affect radically the drip rate from day to night or from shade to direct sunlight. The clamp legs 52 of our preferred embodiment have knife edges 54 engaging the tubing, which will minimize the tendency of the hose 40 to relax over time or due to a rise in temperature and thereby unintentionally allow the clamp 50 to cut off water flow.

While servicing a dripper 22, the water flow can be stopped by pinching the plastic tube 20 upstream of the dripper 22 or fully closing clamp 50 if located on tube 20 upstream of the dripper 22.

At the other ends of tubes or hoses 40 at the plant sites as shown in FIGS. 7 and 7A, we provide drip control gates 60, each of which includes a stem 61 inserted into and frictionally held by the tube or hose 40 and having a variable depth notch 62 which by the depth of insertion of stem 61 into the tube 40 forms a variable orifice with tube 40 and thus controls the individual water flow rate to its adjacent plant without significantly affecting water flow from the same dripper 22 to other plant sites. Because the notch 62 does not extend the entire length of stem 61, water flow to that plant site can be stopped by pushing gate 60 all the way into hose 40 and beyond the narrow terminus of notch 62 to a circular stop 63 axially aligned with the stem and larger in diameter than the tube 40. Positioning or removal of the gate 60 can be done manually by the integrally molded semicircular finger tab 64, as shown on edge in FIG. 7.

In order to increase the number of plants to which water can be applied directly from the existing drippers 22, our invention also preferably includes one or more "crosses" 70 with connecting legs 71 having an outer diameter that can frictionally fit into a standard garden hose and an inner diameter that will accept a standard tube, also by friction fit. Crosses 70 can be three-legged or more, although four is preferred, and plugs similar to gates 60 (not shown) can be provided as closures for specific legs 71 if fewer are needed for a particular use. Similar plugs can be used at manifold 14 for applications that do not use all of the available ports 15. The outside diameter of such closure plugs are compatible with the inside diameters of the connector legs 71 and manifold ports 15 to allow for a press fit. To reduce the number of different components, however, we prefer using as the closures a short length of tubing fit into the connector leg 71 or port 15 and a gate 60 inserted completely into the other tube end to close off water flow at that cross leg 71 or port 15.

The inner and outer diameters of all of the connecting portions of the intermediate parts of our invention, namely the drippers 22 and the crosses 70, are preferably the same, in order to frictionally receive a tube of 0.30" OD inside the connecting portions of drippers 22 and crosses 70 for smaller plants, and a 0.50" ID hose to frictionally fit over those connecting portions for larger plants. Each connecting leg 43, 45 of dripper 22 and leg 71 of cross 70 should be at least 0.5 inches or preferably about 0.7 inches in length to ensure a sufficient connection that will avoid accidental separation. Each of the connector legs 71 of crosses 70 at their inner diameters might also include an integrally molded detent (not shown) to act as a stop and thereby prevent accidental insertion of a tube 40 into the intersection of the crosses 70 so as to impede water flow.

Liquid and soluble fertilizer may be added to reservoir 12 to provide a constant source of nourishment to the plants. Also, other plant treatments can be dissolved in the water within the reservoir 12 to dispense the treatments in predetermined amounts and in predetermined concentrations to individual plants. To reduce the possibility of damaging the soil, the reservoir 12 also allows chlorine and other such volatile plant contaminants to evaporate before the water is dispersed. Hoses 40 can be positioned to provide "site specific" watering for the individual plants and the ends of the hoses 40 at the plants can be covered with mulch to reduce evaporation.

Although the sun increases the temperature of the water in reservoir 12, which is beneficial for most plants, in cooler environments reservoir 12 can be colored black to warm the water applied to the soil, or white in warmer environments to apply cooler water to the soil. As many water supplies are very cold, the slower drip rate of our watering system avoids shocks associated with applying a larger volume of cold water to the plants.

Reservoir 12 can be located in a position that is surrounded by plants, or a cage (not shown) surrounding the reservoir 12 can be used for supporting climbing plants. If aesthetics are important, the surrounding plants help to obscure the reservoir 12 from sight.

Since plants as they get larger need more water, it can be seen that by our invention the drip rate can easily be increased and monitored. The reservoir 12 can generally be any available tank or bucket of sufficient size to sustain a constant output for a given amount of time. The size of the one or multiple number of reservoirs will depend on several factors such as climate, garden area, plant types and number being serviced, and the soil conditions.

In addition to positioning reservoir 12 above the planting level, it may also be advantageous to raise reservoir 12 above ground in order to facilitate monitoring of the dripper when setting the rate of flow, making it easier to see the reservoir water level in the sight glass 18 as well as increasing somewhat the flow pressure. If glass is not preferred for level indicator 18, an extended length transparent tube 19 can also act as the sight glass.

All consumable parts such as the tubing and filter material can be off-the-shelf items, or recycled garden hose; and buckets, barrels and other plastic, fiberglass or galvanized containers used as the reservoirs. The non-consumable manufactured parts according to our invention can be made from recycled plastic such as polypropylene and are extremely durable, to provide a lasting resource for gardeners.

TEST DATA

Testing was done in order to determine the effects of drip rate on a number of variables, including hose length, hose diameter, dripper design, clamp design, reservoir level, height of the reservoir, time of use, and ambient and water temperatures.

Two drippers A and B were connected to a common five gallon reservoir as shown in FIGS. 8 to 11, wherein H1 denotes the water level within the reservoir, H2 denotes the height of the manifold from the ground level, LA is the length of a feeder hose from dripper A. LB is the length of a feeder hose from dripper B, in which the open ends of both hoses were at ground level.

Figure 8:
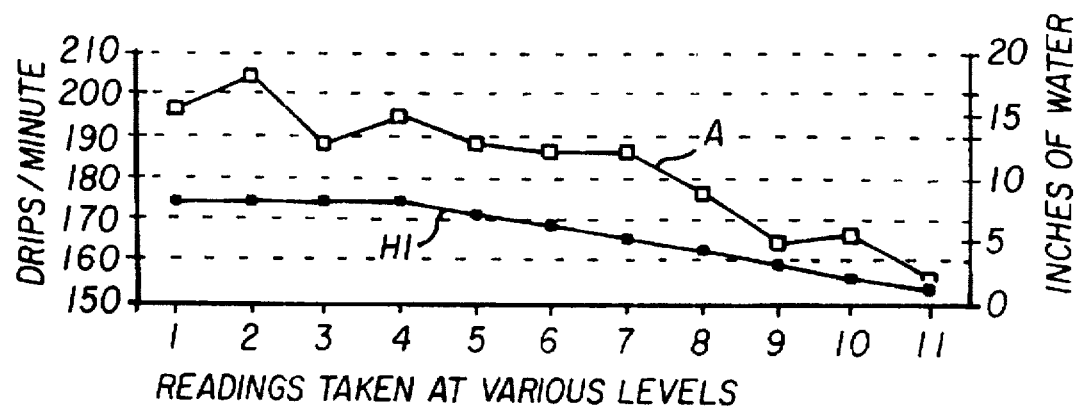
FIGS. 8–11 are graphs of flow rates found from our dripper system.

The graph in FIG. 8 is an example of a test of the effect of the water level in the reservoir on the drip rate. In this particular case, only dripper A was monitored. The readings were consecutive and only minutes apart. There is noticeable instability in the drip rate even in the first four readings where the reservoir level is constant, which we found to be a function of the method of clamping the tubing downstream of the dripper. However, once a desirable clamping position is found, drip rate tracks closely with water height as was expected.

Figure 9:
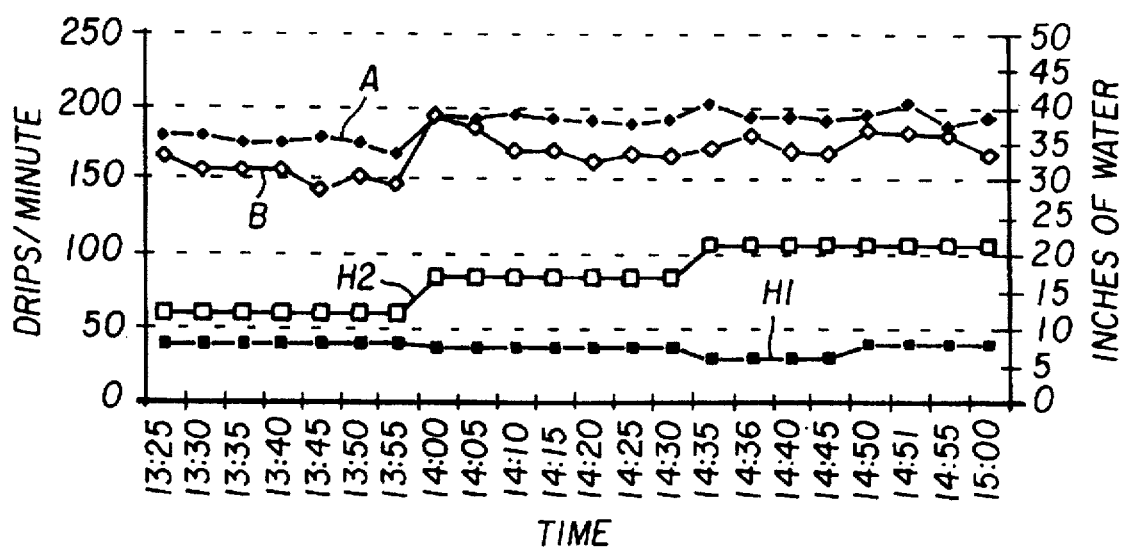

The graph of FIG. 9 represents a more extended test in which the reservoir height (H2) was raised two times. Both drippers in this case had 28 inches of hose downstream of the dripper. When the reservoir height (H2) was raised the first time, there was some increase in the drip rate of both drippers. The second time the height (H2) was raised, the increased drip rate was not as noticeable, presumably because the second incremental height increase was less than the first, and water pressure is a direct function of the water level.

Figure 10:
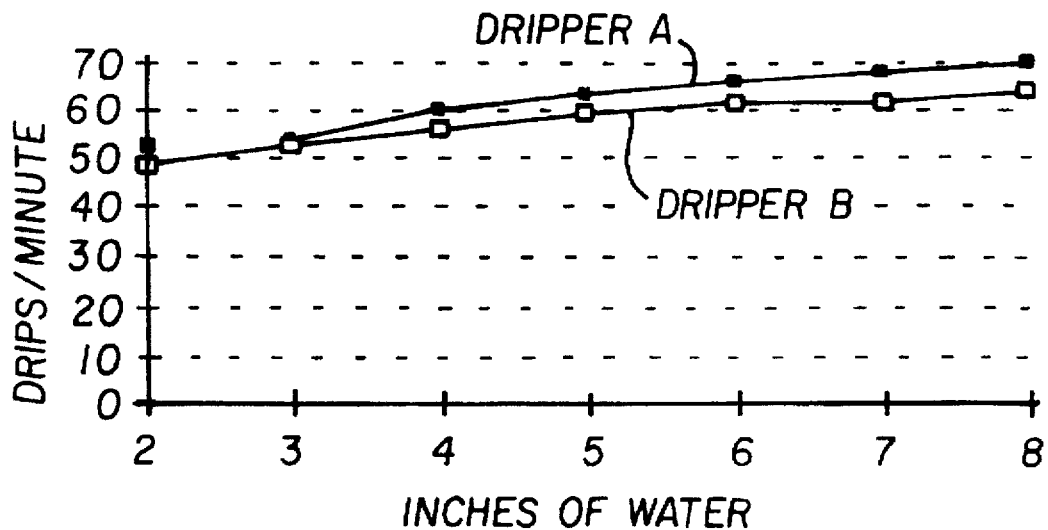

The graph of FIG. 10 is taken from a test performed to check the effect of hose or tubing length on the drip rate with the hose lengths substantially different in length for drippers A and B, respectively. Hose length does not appear to have any significant effect on the drip rate, as both drip rates tracked very closely with each other over the 6 inch variation in the reservoir water level.

Figure 11:
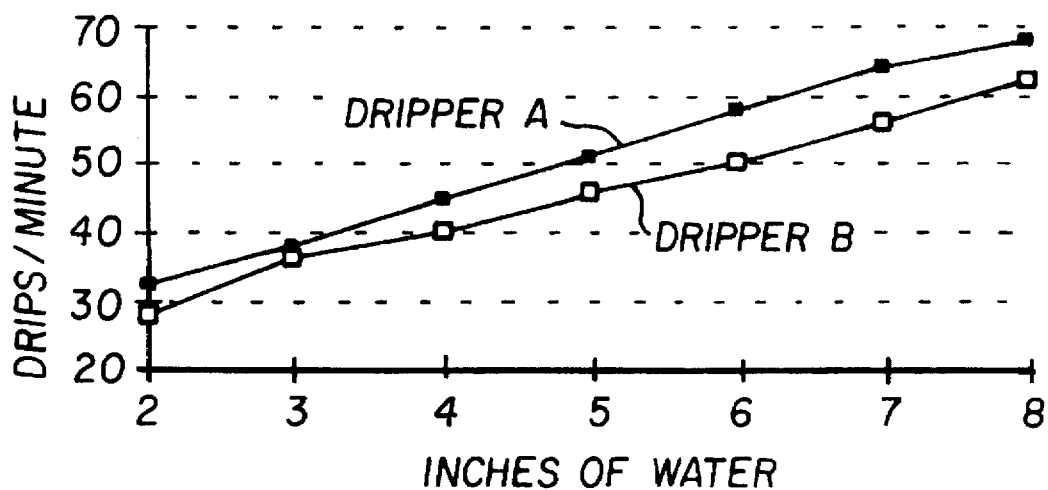

The drip rate in this test as compared to the drip rate in the graph of FIG. 11 which follows is relatively stable. The added stability of the drip rate in the test of FIG. 10 presumably is due to the effect of the head pressure in the tubing below the drippers, which pull the drips through the system in a siphoning action. The effective head of pressure on the drippers in this case was H1+H2, although H2 may not have quite the same effect for each incremental change in height as H1 because of line resistance.

The graph of FIG. 11 shows the effect of the level of water in the reservoir on the drip rate with no siphoning effect. There were no tubes 40 downstream of the drippers 22 in this test, and the total head pressure was H1 alone. As expected, the drip rate drops dramatically with a drop in fluid level in the reservoir.

APPLICATIONS

As can now be seen, the modular feature of our invention can produce a wide variety of continuous flow configurations for a wide number and variety of plants and plant sizes. For example, a desirably sized configuration for a home garden or for foundation plantings might consist of a single reservoir 12 to which a single manifold 14 may be attached. Connected to each of the three ports 15 will be a dripper 22, for a total of three, each of which in turn is connected by a hose 40 to a cross 70 to feed water to the cross. Three tubes or hoses 40 may then each be connected to the other three legs of each cross 70 to produce a total of nine plant feeding lines to drip control gates 60 at nine separate plant sites. Depending on the plant size, any one of the 0.30 inch OD tubes may be replaced by 0.50 inch ID hoses to increase the capacity of water flow to particular plants. Alternatively, one or more of the crosses 70 can be used as splices at specific plant sites in which two of the connecting legs 71 of the cross 70 are used with short tubing 40 to water adjacent plants and a further length of hose 40 connected to the remaining leg 71 to further transport water to another cross 70 or control gate 60 to feed even more plants.

For example, as shown in FIG. 1, an installation of our invention may comprise a foundation planting fence in which reservoir 12 is located adjacent to the interior corner of a wall or fence 80 as shown. One of the drippers 22 connected to the manifold 14 directs water to foundation plantings 82 at one side of the fence, a second dripper 22 directs water to foundation plantings 84 at the other side of the fence, whereas the third dripper 22 can direct water to the flower bed 86 shown. In this case, 0.5 inch ID hose lines might be used from the drippers to the larger foundation plants 82, 84 and larger flower bed 86, all of which hoses can be buried, and crosses 70 at the plant locations to direct 0.30 inch OD tubes to the individual plants with accessible drip control gates 60 at the plant site ends of each tube 40 to individually control water flow to the various types of plants in the flower bed.

Figure 12:
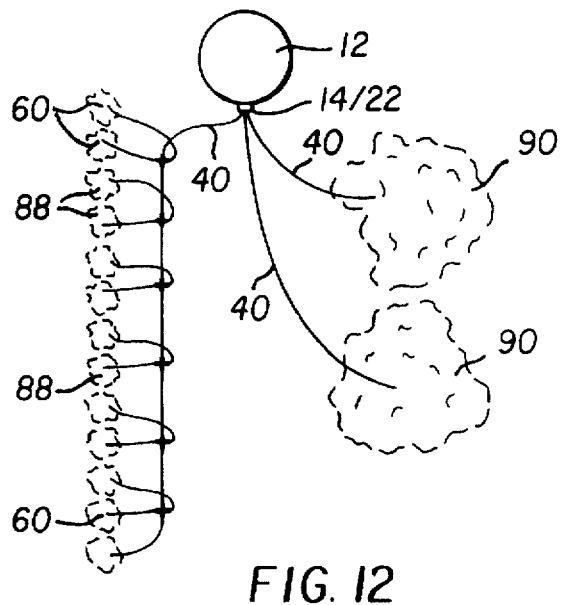
FIGS. 12–14 illustrate just three of the many additional irrigation installations possible with our invention.

FIG. 12 illustrates another system in which one of the tube lines 40 feeds a number of tomato plants 88 which are individually controlled by drip control gates 60 at the plants' sites, whereas the other two tube lines 40 can feed, for example, two groupings of hill plants 90 such as cantaloupe, which can be controlled at the reservoir directly by two dripper clamps 50 and/or at the plant sites by gates 60. In this case, approximately 50 feet of 0.50 inch OD hose can be used to direct water from the manifold 14 and drippers 22 to the various plant sites.

Figure 13:
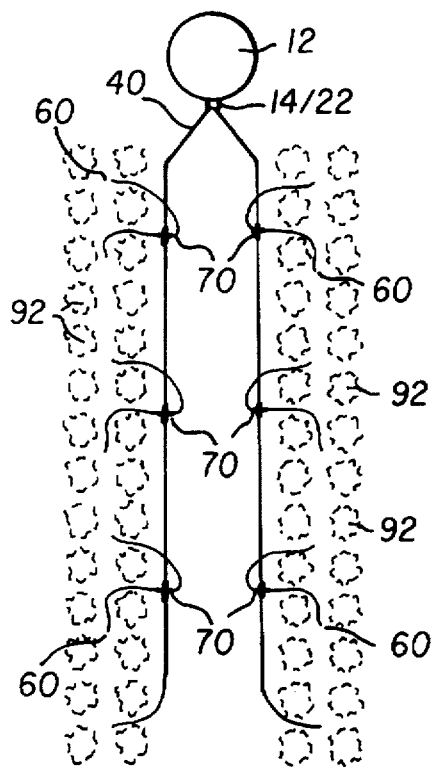
Figure 14:
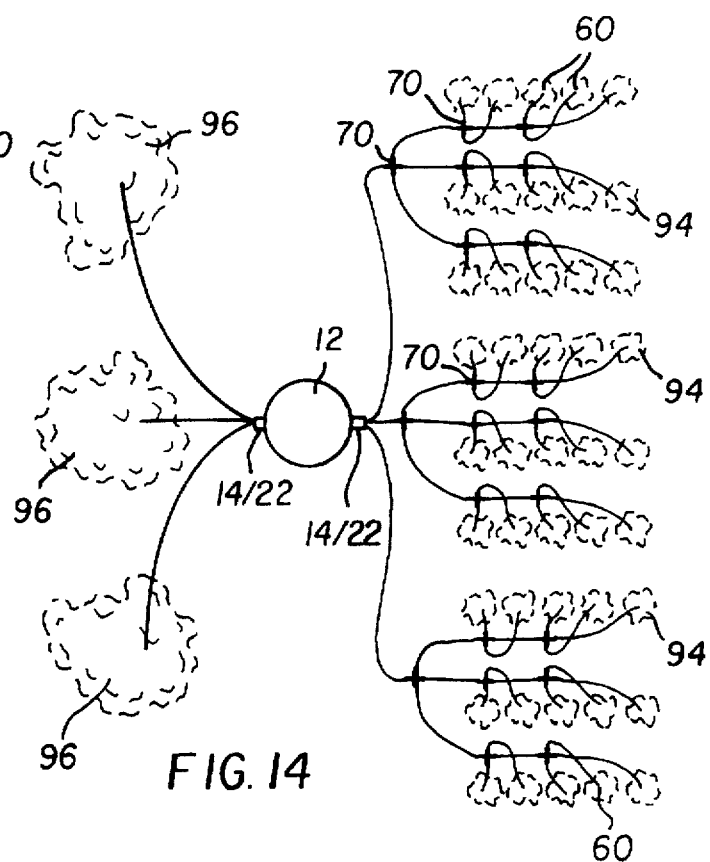

FIG. 13, on the other hand, illustrates a single reservoir 12 and manifold 14 to feed a substantial number of closely planted items, such as strawberry plants 92, and the irrigation rate controlled by gates 60 at the plants to feed more or less water to each plant depending on individual plant growth or variety. As the third manifold port 15 is not being used, a short piece of 0.30 inch OD hose 20 is used with a control gate 60 fully inserted to block that port 15. In the case of FIG. 14, reservoir 12 might be equipped with two separate manifolds 14 in which one manifold 14 might control as many as nine different rows of row crops 94, and the other manifold 14 feeding as many as 3 large hill crops 96, such as watermelon. In this case, the large hill crops 96 can be drip controlled at the drippers 22 close to the reservoir 14, whereas the row crops 94 can be individually drip controlled by gates 60 directly at the plants.

The advantages of our invention include ease and flexibility of assembly, durability, ease of use and maintenance, conservation of water, energy and time, and inhibited weed growth. The benefits also include the ability to vary water flow from extremely low to rapid drip rates selectively to individual plant sites, a reservoir fed drip system, the ability to water many individual and varied types of plants, and the capability of easily adding liquid or soluble fertilizer. Although our invention is described by reference to a specific preferred embodiment, it is clear that variants can be made and other materials used without departing from the spirit of the invention as claimed.

We claim:

1. A modular system to irrigate at least one plant site, comprising reservoir means for receiving a volume of water, manifold means for selectively drawing water from the reservoir means, dripper means including means defining a water inlet and a water outlet for producing by gravity droplets of water at a variable drip rate, fluid directing means for directing water from the manifold means to the water inlet of the dripper means, means for varying the drip rate of the water droplets, and distribution means for directing the water droplets from the water outlet of the dripper means to the plant site, wherein the dripper means comprises an upper hollow section having a fluid connection to the water inlet, a lower hollow section frictionally fitting with and manually detachable from the upper section and having a fluid connection to the water outlet, the two hollow sections forming a drip cavity in which the water droplets are formed and which cavity is accessible when the two hollow sections are detached.

2. The system according to claim 1 wherein at least one of the hollow sections is transparent to permit visual inspection of the drip rate.

3. The system according to claim 1 wherein the fluid directing means is detachable from the manifold means and the dripper means, and wherein the distribution means is detachable from the dripper means.

4. The system according to claim 1 wherein the reservoir means is at least partially defined by a reservoir wall with an inner and an outer surface, means defining an opening in the reservoir wall, and wherein the manifold means comprises a first section connected to the outside of the reservoir wall and covering the reservoir wall opening, the first section defining at least one port in fluid connection to the fluid directing means, a second connector section covering the wall opening on the inner surface, means to attach the second section and the first section of the manifold to the reservoir, and means formed by the second section for permitting water to flow from inside the reservoir means to the port.

5. The system according to claim 1 wherein at least one of the water directing means and the water distribution means comprises a tube formed by a flexible wall, and the means for varying the drip rate comprises an adjustable clamp mounted on the tube substantially adjacent the dripper means to variably constrict the tube by variably squeezing the tube wall.

6. The system according to claim 1 and further comprising adjustable control gate means at the plant site for varying the amount of water ejected from the distribution means to the plant site.

7. The system according to claim 6 wherein the distribution means comprises a tube with an end to be positioned adjacent the plant site, and the control gate means comprises a stem insertable into the tube end at variable depths, the stem defining a variable width notch that with the tube end defines an opening of variable cross section determined by the depth of insertion of the stem into the tube end.

8. The system according to claim 1 to irrigate multiple plant sites and further comprising at least one cross member comprising at least three hollow connecting legs in fluid connection with each other, one of which legs is detachably connectable to the water distribution means, and further comprising second water distribution means detachably connectable to the other two legs for redirecting water to the multiple plant sites.

9. The system according to claim 1 and further comprising a filter positioned within the cavity.

10. A modular system to irrigate a plurality of plant sites, comprising reservoir means for receiving and holding a volume of water, the reservoir means defining an opening through which water can be drawn from the reservoir means, at least one manifold to direct the flow of water drawn from the reservoir means in at least two distinct directions, at least two dripper devices each including means defining a water inlet and a water outlet for producing by gravity droplets of water at a variable drip rate, fluid directing means for directing water from the manifold to the water inlet of each of the dripper devices, means for varying independently the drip rate of the water droplets produced by each of the dripper devices, and distribution means for directing the water droplets from the water outlet of each of the dripper means to at least one plant site wherein the reservoir means is at least partially defined by a reservoir wall with an inner and an outer surface, and the means defining the opening are formed by the reservoir wall, and wherein the manifold comprises a first section connected to the outside of the reservoir wall and covering the reservoir wall opening the first section defining at least two ports each in fluid connection to the fluid directing means to one of the dripper devices a second connector section covering the wall opening on the inner surface means for attaching the second section and the first section of the manifold to the reservoir, sealing means between at least one of the reservoir wall surfaces and one of the manifold sections for preventing water from escaping the reservoir means except through the ports, and means formed by the second section for permitting water to flow from inside the reservoir means to both of the ports.

11. The system according to claim 10 wherein each dripper device comprises an upper hollow section having a fluid connection to the water inlet, a lower hollow section frictionally frictionally fitting with and detachable from the upper section and having a fluid connection to the water outlet, the two hollow sections forming a drip cavity in which the water droplets are formed.

12. The system according to claim 11 wherein the hollow sections are transparent to permit visual inspection of the drip rate.

13. The system according to claim 11 wherein each dripper device further comprises upper and lower connecting legs to provide the fluid connection, respectively, to the water inlet and to the water outlet, and each of the upper and lower legs comprise grip tabs for manual attachment and detachment of the frictional fitting of the upper and lower sections.

14. The system according to claim 11 and further comprising a filter positioned with in the cavity.

15. The system according to claim 10 wherein the fluid directing means comprises at least two flexible tubes each detachable from the manifold and one of the dripper devices, and wherein the distribution means comprises at least two flexible tubes each detachable from one of the dripper devices.

16. The system according to claim 15 wherein at least one of the flexible tubes connected to each of the dripper devices is formed by a flexible wall, and the means for varying the drip rate comprises an adjustable clamp mounted on the tube substantially adjacent the dripper device to variably constrict the tube by variably squeezing the tube wall.

17. The system according to claim 10 and further comprising an adjustable control gate at each of the plant sites to vary independently the amount of water ejected from the distribution means to the plant site.

18. The system according to claim 17 wherein the distribution means comprises a tube with an end positioned adjacent to the plant site, and the control gate comprises a stem insertable into the tube end at variable depths, the stem defining a variable width notch that with the tube end defines an opening of variable cross section determined by the depth of insertion of the stem into the tube end.

19. The system according to claim 10 and further comprising at least one cross member comprising at least three hollow connecting legs in fluid connection with each other, one of which legs is detachably connectable to the water distribution means, and further comprising second water distribution means detachably connectable to the other two legs for redirecting water to at least two separate plant sites.

* * * * *